Jan. 9, 1968     L. KING     3,362,862
LAMINATED PRODUCTS AND METHOD OF MAKING SAME
Filed Nov. 15, 1963
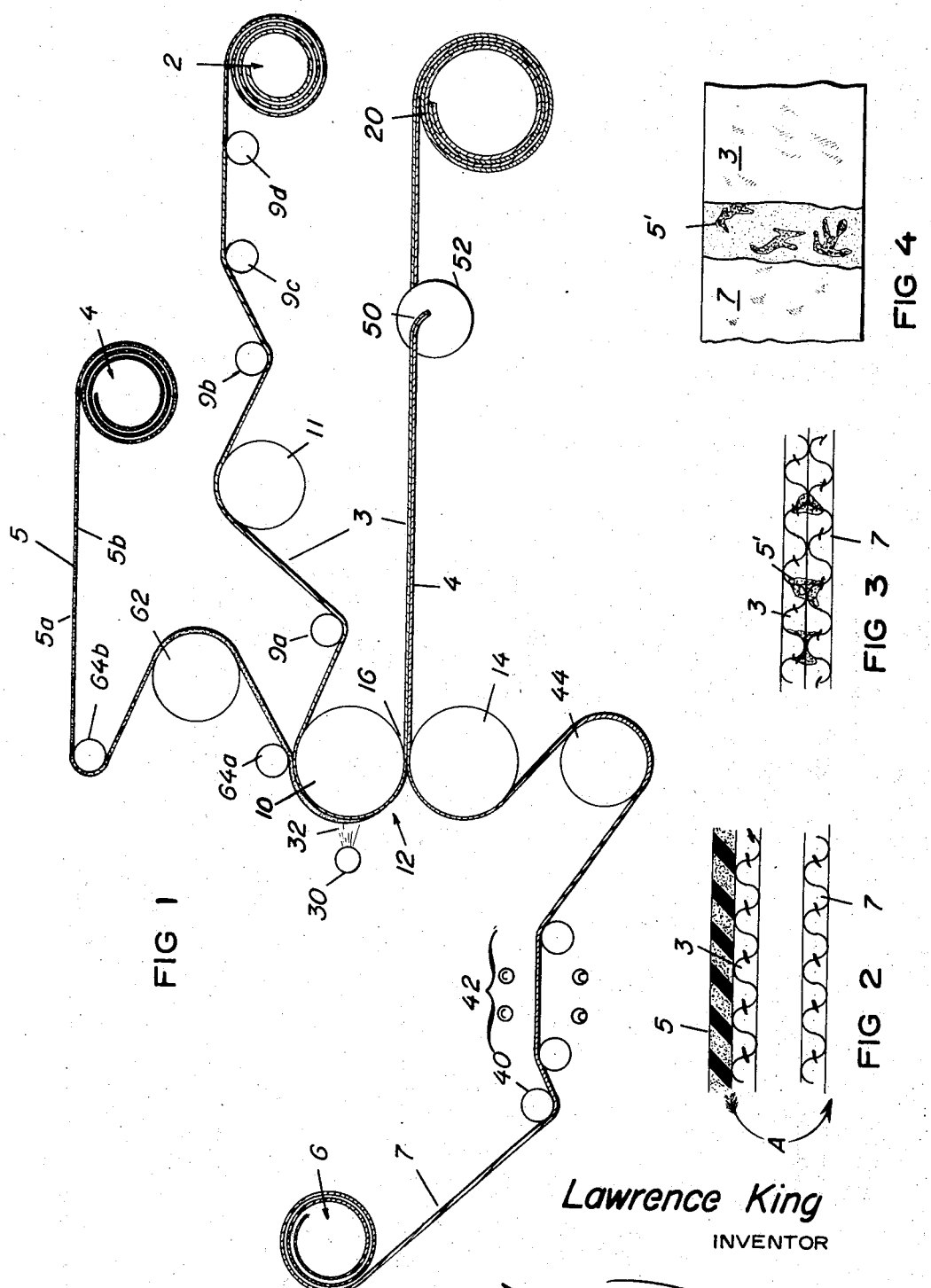
Lawrence King
INVENTOR
BY *Jacobi & Davidson*
ATTORNEYS

United States Patent Office 3,362,862
Patented Jan. 9, 1968

3,362,862
LAMINATED PRODUCTS AND METHOD
OF MAKING SAME
Lawrence King, New York, N.Y., assignor to Rosfor Mills Corporation, New York, N.Y., a corporation of New York
Filed Nov. 15, 1963, Ser. No. 323,946
7 Claims. (Cl. 156—82)

This invention relates to laminated products and methods of making the same, and in particular, is concerned with products wherein flexible layers are joined together by a flexible bonding medium therebetween.

For certain purposes, such as for example, in forming laminated fabrics, it is desirable to bond respective layers together substantially completely throughout an interface therebetween, and to make the bonding such that the same affords complete flexibility. To this end, it has previously been suggested that certain wet adhesives be utilized, and that a layer of foam material be bonded to a fabric or sandwiched between fabric layers. The foam materials are known to be capable of presenting tacky surfaces when subjected to heat, and in making prior laminations with the foam, one surface has been rendered tacky for joining with a single fabric layer, or respectively opposite surfaces have been rendered successively tacky for bonding with fabric layers on opposite sides of the foam layer.

With the use of adhesives, one encounters the attendant problems of depositing the adhesives, of drying the adhesives and/or of preventing adhesive stains or bleeding. With the foam approach, such problems are generally eliminated, but still, with this approach, the ultimate lamination assumes a thickness substantially greater than the thickness of the original materials in many instances. Accordingly, in the past, where first and second layers were to be bonded together and thickness increments were undesirable, the so-called adhesive approach has been adopted and foams have been disregarded.

The present invention is directed to the provision of a laminated product wherein a synthetic resin foam material is used as a bonding agent between respective layers to be laminated or bonded together without materially increasing the thickness of the ultimate product beyond the thickness of the layers themselves and without providing a resulting lamination which has the feel and other characteristics common to presently known foam laminations.

More specifically, it is an object of the present invention to provide what essentially consists of a layer-to-layer lamination, but wherein a disintegrated or collapsed synthetic resin foam material effects the bond between the respective layers. Still, further, it is an object hereof to provide such a laminated product wherein the bond is so achieved that the ultimate product possesses the flexibility and feel characteristics only of the laminated materials themselves, rather than any characteristic which is particularly attributable to the presence of foam itself.

Consistent with the preceding objects, which are directed to novel product aspects hereof, there are certain further basic objects of the invention relating to the method aspects. Specifically, it is a primary and basic object of the present invention to provide a method of making a product such as described above wherein a layer of foam material is subjected to a heating operation sufficient to render opposite forces of the layer simultaneously tacky and sufficient to at least partially disintegrate or collapse the foam layer, whereby when respective outer layers are pressed together with the partially disintegrated or collapsed foam layer therebetween, the resulting lamination is effectively one where- in the foam layer serves only as a bonding agent rather than a continuous layer giving foam type physical characteristics to the end product.

Notwithstanding the preceding objects, and the desirability of achieving the product as prescribed above, it is to be understood that an important object of the present invention is to provide a method of handling continuous lengths of material forming outer lamination layers and continuous lengths of an intermediate foam material, which method provides for rendering opposite faces of the foam layer simultaneously tacky whereby the outer layers can be simultaneously joined with the foam layer therebetween, whether the foam layer be of continuous phase forming a foam type lamination, or whether the foam layer be of discontinuous phase forming solely a bonding agent between the outer layers.

In addition to the previously stated more general and basic objects of the present invention, there are certain further yet more specific objects hereof, including: (a) the provision of a method of forming a laminated body whereby three rolls of material, one of which is a roll of self-sustaining and flexible synthetic resin foam material, can be simultaneously and continuously processed to form a resultant laminated product through the use of but a single heating or flaming station; (b) the provision of such a method wherein the layer of foam material which is utilized is supported in superimposed but bond-free relation to one of the outer layers of the laminated product while the foam material is heated and at least partially disintegrated or collapsed to render opposite faces thereof simultaneously tacky, so that immediately thereafter a bonding between the respective outer layers of the lamination can be achieved by passing the respective outer layers through but a single pressing station; and (c) the provision of such a method wherein (1) the operation of pressing the respective layers together can be easily achieved between the nip of a pair of pressure rollers, and (2) the heating operation can be readily achieved by subjecting the foam layer to a flame treatment as the same moves over one of such pressure rollers.

The invention lies in certain structural characteristics and properties of a product formed in accordance therewith, as well as certain steps carried out in accordance with the method provided thereby. The invention will be better understood, and objects other than those specifically set forth above will become apparent, when consideration is given to the following detailed description. Such description makes reference to the annexed drawings wherein:

FIGURE 1 is a schematic side view of an arrangement adapted to carry out the method aspects hereof to form the products hereof;

FIGURE 2 is a schematic fragmentary cross sectional view of respective layers initially used in forming a product hereof;

FIGURE 3 is a fragmentary cross sectional view of a product formed in accordance herewith; and FIGURE 4 is a fragmentary plan view of the product shown in FIGURE 3, with one section thereof broken away.

In FIGURE 1, the basic constituents of the ultimate product are shown as being supplied from respective supply rolls 2, 4 and 6. The supply roll 2 comprises a roll of flexible material, such as for example a fabric material. The roll 4 on the other hand, is a roll of self-sustaining and flexible synthetic resin foam material, specifically polyurethane foam or polyethyl foam, and preferably polyurethane foam. The roll 6, again, is a layer of flexible materials such as for example fabric.

The respective rolls, 2, 4 and 6, as well as other rolls or rollers referred to in this description are suitably supported in a given apparatus. The apparatus for handling lengths of material in roll form is well known, and the details of the mechanical construction utilized are not significant with respect to the invention. Similarly conventional tensioning techniques can be used to maintain tension of material being fed to respective stations, but this invention is not concerned with these techniques. Accordingly, it is believed that the invention can be clearly understood from the schematic illustration presented in FIGURE 1.

To appreciate the overall process, it is helpful to first consider the path of travel assumed by the lengths of material 3, 5 and 7, which travel respectively from the supply rolls 2, 4, and 6. The material 3 passes first over a plurality of guide rollers 9d, 9c and 9b, then over a conventional slat expander 11 and again over a guide roller 9a to and around a pressure roller 10. The pressure roller 10 is part of a pressure system, generally designated by the numeral 12, which system is formed by the cooperation of the pressure roller 10 with an adjacent pressure roller 14. The rollers 10 and 14 provide a pressure nip 16 therebetween.

The material 3 passes adjacent and in contact with the peripheral surface of the pressure roller 10 and travels therearound eventually being wound, as laminated, on a take-up roll 20.

The synthetic resin foam material 5, on the other hand, preferably passes from the supply roll 4 to and over a guide roller 64b, then over a conventional slat expander 62 to and under an idler 64a to the pressure roll 10. Since the foam layer 5 is partially disintegrated or collapsed as more fully described below, the idler roller 64a is provided. This roller is mounted in conventional manner such that its own weight creates a holding pressure on the foam layer thereunder to maintain the foam layer 5 in continuous engagement with the pressure roller 10 behind the disintegration station whereby the foam continuously feeds forward over roller 10 notwithstanding the disintegration operation. The foam material 5 accordingly is in superimposed or overlying relation to the first layer of material 3 as the respective layers 3 and 5 pass initially around the pressure roller 10. As so disposed, one face of the foam material or layer 5 is exposed.

As the layer of foam material 5 passes over the pressure roll 10, the same is subjected to a heating operation preferably by flames passing from a burner 30 which is disposed adjacent parallel and coextensively across the length of the roller 10. The heat which is applied by the burner 30, or by the flames 32 issuing therefrom, is sufficient, in accordance herewith, to render the non-exposed face of the foam layer 5 tacky in condition. More specifically, the foam layer or material 5 has an upper face 5a and a lower face 5b as the same travels to the pressure roller 10. The face 5a is subjected directly to the flames 32 issuing from the burner 30, and the heat which is applied is sufficient to render the non-exposed or underface 5b tacky. At the same time, this heat is insufficient to cause a burning of the material 3 which underlies the underface 5b of the foam layer or material 5.

The heating operation referred to above is performed to at least partially disintegrate or collapse the foam material so as to reduce the thickness of the foam layer by at least half its original thickness. Particularly satisfactory results have been achieved where the foam layer 5 has an original thickness of between .005 and .075 inch, preferably .015 to .030 inch. Not only is this thickness desired, but it has been found preferable to use polyurethane foam, although polyethyl foams can also be used.

From the basic standpoint, it is important to understand that the heating operation performed as the foam layer 5 passes the burner 30 is such that the then non-exposed face or side 5b of the foam layer is rendered tacky. Consequently, as a result of this operation, the exposed face 5a is rendered tacky, or more particularly, the non-disintegrated portion thereof is tacky. It should be here understood that disintegration or collapse of the layer such that it is discontinuous in phase may be desired, in which event opposite faces of remaining foam deposits would be tacky.

Still, as the layer 3 travels about the roller 10, it carries the foam layer 5 or the disintegrated portion thereof which has passed the burner 30 into the nip 16, where is meets with the length or layer of material 7 coming from the supply roll 6. The length of material 7 initially passes a guide roller 40, then preferably passes through an edge sensing and aligning arrangement 42 over a guide roller 44 into the nip 16. The arrangement 42 includes a pair of photo-electric sensing devices which, through suitable controls, are operative to properly position the layer of material 7 so that it mates with or joins the layer 3 and the remainder of the foam layer 5 carried thereby as the layers 5 and 7 enter the nip 16.

It will be remembered that opposed faces of the foam layer or disintegrated foam material have been rendered tacky by the action achieved with the burner 30 and flames 32. Thus, as the respective layers 3 and 5 pass into the nip 16, pressure is applied forcing the respective layers 3 and 7 together with the foam material 5 therebetween. This pressure is sufficient to adhere the layers 3 and 7 together through the foam layer 5, or the remainder thereof. The layers 3 and 7 as then bound together pass a cutting station 50 where roller cutters such as the cutter 52 trim opposed edges, and from the cutter station, the then laminated arrangement, as indicated above, passes on to the take-up roller 20.

From the preceding description, it will be noted that the foam layer 5 is supported over the flexible layer 3 with the foam layer and the flexible layer being free of bonding therebetween as the same initially pass around the pressure roller 10. Then, during the passage around the pressure roller 10, there is a heating and disintegrating or collapsing of the foam layer 5 as supported over the flexible layer 3 to render opposite faces of the foam layer 5 or disintegrated portions thereof simultaneously tacky. Following this operation, the respective outer flexible layers 3 and 7 are pressed together in the nip 16 between the rollers 10 and 14 with the foam layer, or disintegrated portion thereof, sandwiches between the respective layers 3 and 7 to adhere such layers together.

If an ultimate product possessing the characteristics of a normal type of foam product is desired, the invention provides the advantage of obtaining a simultaneous outer layer-foam-outer layer lamination through the use of but a single heating or burning step and through the use of but a single pressing step.

On the other hand, where the ultimate lamination is to possess the characteristics of a product wherein there is basically an outer layer to outer layer lamination such as for example, a fabric to fabric lamination, then the foam is substantially disintegrated or collapsed during the heating operation or at the time the same is subjected to the flame 32 issuing from the burner 30. A foam layer in its true sense is no longer apparent on the layer 3 as the same passes to the nip 16 between the rollers 10 and 14. Instead, such roll then carries a disintegrated or collapsed and discontinuous body of foam material, but this body is sufficient to achieve the adherence desired.

The foregoing is possibly better understood by reference to FIGURES 2, 3 and 4. In FIGURE 2, the layer 3 is shown as a fabric layer, the layer 7 is shown as a fabric layer, and the layer 5 is shown as a foam layer with an original thickness D. The foam layer 5 extends across the layer 3 covering the same as shown. This is the relative appearance of a cross-section of the superimposed layers 3 and 5 at the top of the roller 10, i.e., as at for example the location designated by the numeral 60. The foam layer 5 is free of any adherence or bonding to the layer 3 at this time, but these respective layers 3 and 5 are moved by the roller 10 in the direction of the arrow A (FIGURE 2). During this movement, the disintegration or collapsing occurs and the foam layer 5 has its thickness reduced by at least half, and for a material to material lamination, the foam layer 5 is essentially disintegrated or collapsed into a discontinuous body. Yet, even though discontinuous and particle or strand like in nature, sufficient foam material remains on the surface of the layer 3. Such foam material is randomly heterogeneously distributed across the layer 3 as the layer 3 enters the nip 16 between the rollers 10 and 12.

In FIGURE 3, a cross section of the ultimate lamination is presented, and by referring thereto, it will be noted that the disintegrated or collapsed foam material here generally designated by the numeral 5' forms but a minor part of the ultimate lamination, with the layers 3 and 7 forming the predominant thickness of the lamination. FIGURE 4 presents a plan view of the lamination shown in FIGURE 3, but with a portion of the layer 3 broken away. It will be noted from these figures that the foam material has disintegrated or collapsed to a point where it is somewhat strand or thread-like in nature. There is a heterogenous distribution of the disintegrated or collapsed foam material but the distribution is generally uniform completely over the interface between the first and second outer layers 3 and 7. Thus, the foam material, while heterogeneous and irregular in physical characteristics as distributed over the interface, serves as a bonding agent for the respective layers 3 and 7, or in fact as an oxidized polymeric adhesive between the layers with the layers being in substantially direct contact with one another.

The lamination shown in FIGURES 3 and 4 possesses the complete flexibility of the original outer layers and the bonding therebetween is achieved through a continuous process which requires but a single heating operation and a single pressing operation, and which eliminates the problems normally encountered with a wet adhesive lamination. In accordance with the method, a foam layer can be disintegrated or collapsed so that opposed remaining surfaces thereof are in a tacky condition and as in this condition, the outer layers of the lamination can be simultaneously bonded together with the foam material effectively serving as a bonding agent that is heterogeneous and in irregular nature, but generally uniformly distributed over the interface between the respective layers.

It should be here-noted that substantial control can be maintained over the ultimate lamination by using a single heating operation or single flame treatment as opposed to a multiplicity of heating operations carried out at successive stations. Further, as noted above, the foam can be disintegrated to a point where it serves essentially strictly as a bonding agent between respective outer layers or without burning of any one of the outer layers, even though the foam is supported on one of such outer layers as subjected to the heating operation.

By carrying out the heating operation on the foam as super-imposed or supported by one of the outer layers, it is possible to immediately thereafter perform the pressure application step, or the bonding step, i.e., heating step and bonding step can be carried out in immediate successive fashion so that the tackiness achieved is not lost during travel of the material between widely spaced stations where a plurality of layers are brought together.

While it has been found that the invention has particular utility when applied in the lamination of fabrics, it will be understood that the invention is applicable with various types of flexible layers, including synthetic as well as non-synthetic fabrics, woven fabrics as well as knitted fabrics, and as well as other materials of flexible nature which desirably can be incorporated in laminated structures. For example, the invention can be applied in laminating foam to foam, or foam to fabric, or the like.

Having now described the invention in considerable detail, it will be appreciated that the objects set forth at the outset of the present specification have been successfully achieved. Accordingly,

What is claimed is:

1. In a method of bonding first and second flexible layers together by means of an interposed synthetic resin foam layer, the improvement which comprises the steps of:
   (a) supporting said foam layer over one of said flexible layers with said foam layer and said one flexible layer being free of bonding therebetween,
   (b) heating and substantially collapsing said foam layer as supported over said one flexible layer to render opposite faces of said foam layer simultaneously tacky, and
   (c) then pressing the first and second flexible layers together with said foam layer therebetween to adhere said first and second layers together by means of the collapsed foam layer.

2. A method of making a laminated product through the use of a pair of rollers disposed to provide a pressure nip therebetween, said method comprising the steps of:
   (a) feeding a first layer of flexible fabric material over and around one of said rollers and through said nip;
   (b) feeding a layer of polyurethane foam material of given original thickness between .005 and .075 inch in superimposed relation over said first layer of material and around said one roller such that one face of said layer of foam material is exposed;
   (c) applying heat to said layer of synthetic resin foam material by subjecting the same to flame as the same passes about said one roller (1) to substantially completely collapse the foam material and reduce the thickness of said foam layer by at least half said original thickness, and (2) to render tacky the face of said layer of foam material opposite said one face;
   (d) feeding the collapsed foam material as superimposed on said first layer through said nip; and
   (e) feeding a second layer of flexible fabric material over and around the other of said rollers and through said pressure nip such that said collapsed foam material bonds said first layer of material over said second layer of material to form a flexible lamination.

3. A method of making a laminated product through the use of a pair of rollers providing a pressure nip, said method comprising the steps of:
   (a) feeding a first layer of flexible material to one of said rollers;
   (b) feeding a self-sustaining and flexible layer of synthetic resin foam material of a given original thickness in superimposed relation over said first layer of material such that one face of said layer of foam material is exposed;
   (c) applying sufficient heat to said one face of said layer of synthetic resin foam to substantially completely collapse said layer of foam material;
   (d) feeding said collapsed foam material as superimposed on said first layer through said pressure nip with said first layer in contact with said one roller; and
   (e) feeding a second layer of flexible material past and in contact with the other of said rollers and through said pressure nip so that said collapsed foam material bonds said first layer of material over said second layer of material to form a flexible lamination.

4. In a method of bonding first and second layers of flexible material together by means of an interposed self-sustaining and flexible synthetic resin foam layer, said foam layer being of a different substance than said first and second layers, the improvement which comprises the steps of substantially completely collapsing the foam layer by applying heat thereto sufficient to render opposite faces thereof simultaneously tacky and then simultaneously binding said first and second layers together with said foam therebetween.

5. A method for making a laminated product through the use of a pair of rollers disposed to provide a pressure nip therebetween, said method comprising the steps of:
   (a) feeding a first layer of flexible material over and around one of said rollers and through said nip, and feeding a layer of synthetic resin foam material of given original thickness in superimposed relation over said first layer of material and around said one roller, such that one face of said layer of foam material is exposed;
   (b) applying heat to said one face of said layer of synthetic resin foam material as the same passes about said one roller to substantially completely collapse the same into a bonding layer and to render tacky the face of said layer of foam material opposite said one face;
   (c) feeding the collapsed foam material as superimposed on said first layer through said nip; and
   (d) feeding a second layer of flexible material over and around the other of said rollers and through said pressure nip and in contact with the other face of said collapsed foam layer, so that said collapsed foam material bonds said first layer of material over said second layer of material to form a flexible lamination.

6. A method of making a laminated product through the use of a pair of rollers providing a pressure nip, said method comprising the steps of:
   (a) feeding a first layer of flexible material to one of said rollers;
   (b) feeding a self-sustaining and flexible layer of synthetic resin foam material of a given original thickness in superimposed relation over said first layer of material such that one face of said layer of foam material is exposed;
   (c) applying sufficient heat to said one face of said layer of synthetic foam to substantially completely collapse and partially oxidize the cellular structure thereof;
   (d) feeding said collapsed foam material as superimposed on said first layer through said pressure nip with said first layer in contact with said one roller; and
   (e) feeding a second layer of flexible material past and in contact with the other of said rollers and through said pressure nip so that said collapsed foam material bonds said first layer of material over said second layer of material to form a flexible lamination.

7. The product made by the process of claim 6.

References Cited

UNITED STATES PATENTS

| | | | |
|---|---|---|---|
| Re. 25,493 | 12/1963 | Dickey | 156—82 |
| 2,946,713 | 7/1960 | Dusina et al. | 156—219 |
| 2,957,793 | 10/1960 | Dickey | 156—82 |
| 3,062,698 | 11/1962 | Aykanian | 156—306 |
| 3,131,105 | 4/1964 | Codos | 156—82 |
| 3,210,227 | 10/1965 | Schickman | 156—82 |
| 3,264,166 | 8/1966 | Lowery | 156—79 X |
| 3,239,399 | 3/1966 | King | 156—82 |

FOREIGN PATENTS

| | | |
|---|---|---|
| 813,311 | 5/1959 | Great Britain. |

EARL M. BERGERT, *Primary Examiner.*

CLIFTON B. COSBY, *Examiner.*